United States Patent [19]

Tweadey, II et al.

[11] Patent Number: 5,705,983
[45] Date of Patent: Jan. 6, 1998

[54] GLAZING UNIT SECURITY SYSTEM

[75] Inventors: Robert F. Tweadey, II, Farmington Hills; Kenneth J. Gajewski, Woodhaven, both of Mich.

[73] Assignee: Ford Motor Company, Dearborn, Mich.

[21] Appl. No.: 589,669

[22] Filed: Jan. 22, 1996

[51] Int. Cl.$^6$ ................................................. G08B 13/04
[52] U.S. Cl. ........................... 340/550; 340/426; 439/917
[58] Field of Search ................................. 340/550, 426; 439/917

[56] References Cited

U.S. PATENT DOCUMENTS

| | | | |
|---|---|---|---|
| 3,609,739 | 9/1971 | Walter | 340/550 |
| 3,863,250 | 1/1975 | McCluskey, Jr. | 340/550 |
| 4,230,918 | 10/1980 | Schroeder et al. | 340/550 |
| 4,796,002 | 1/1989 | Heidman, Jr. | 340/426 |
| 4,804,946 | 2/1989 | Elkowitz | 340/550 |
| 4,878,044 | 10/1989 | Hickman | 340/550 |
| 4,999,608 | 3/1991 | Galomb | 340/550 |
| 5,005,020 | 4/1991 | Ogawa et al. | 343/713 |
| 5,114,756 | 5/1992 | Mirabeau et al. | 427/379 |
| 5,139,850 | 8/1992 | Clarke et al. | 428/192 |
| 5,198,723 | 3/1993 | Parker | 313/634 |
| 5,389,911 | 2/1995 | Madau | 340/426 |

*Primary Examiner*—Glen Swann
*Attorney, Agent, or Firm*—Lorraine S. Melotik, Esq.

[57] ABSTRACT

A glazing unit has a tempered glass pane or other frangible glazing pane carrying a glazing pane breakage detector assembly. The detector assembly includes spaced first and second electrically conductive bus pads formed of electrically conductive material on a surface of the glazing pane. An electrically resistive trace on the surface of the glazing pane is formed of electrically resistive material different from the electrically conductive material of the bus pads. The resistive trace establishes a non-short electrical interconnection between the bus pads, which can be formed of highly conductive material, such as silver-filled paint currently in widespread commercial use. Such bus pads afford a structurally sound attachment, with good electrical contact by soldering, electrically conductive epoxy or the like upon which upstanding attachment tabs are secured. Electrical leads can be attached to such upstanding tabs to connect the detector assembly to suitable security circuitry. The resistive trace is fragile, such that security circuitry can detect and respond to loss of electrical connection between the bus pads upon fracture of the glazing pane underlying the resistive trace. Security circuitry also can detect a change in the resistance of the electrical connection between the bus pads, such that security is not defeated by a jumper cable between the bus pads. The resistance value of the resistive trace between bus pads can be varied from one glazing pane to another to further enhance security.

9 Claims, 3 Drawing Sheets

GLAZING UNIT SECURITY SYSTEM

FIELD OF THE INVENTION

The present invention is directed to a window or other glazing unit wherein a tempered glass pane or other frangible glazing pane carries a glazing pane breakage detector assembly. The present invention is directed also to a security system incorporating such glazing units.

BACKGROUND

Security systems are known for detecting breakage of a tempered glass pane or other frangible glazing pane, for example, for detecting breakage of a backlite in a motor vehicle. Such systems typically include means for detecting breakage of the pane and means for responding to such breakage, for example, by sounding an alarm or disabling the motor vehicle powertrain. Glazing unit security systems have employed circuitry for detecting loss of electrical continuity upon breakage of the glazing pane. In U.S. Pat. No. 3,609,739 to Walter, a glazing security system employs an electrically conductive strip forming a closed loop around the outer perimeter of a glass pane. Such full perimeter strips, however, present appearance problems, especially for motor vehicle windows. In addition, known systems employing electrical continuity loss detection circuitry may in some applications be defeated by a jumper cable attached between the positive and negative terminals.

In commonly assigned U.S. Pat. No. 5,389,911 to Madau, an alarm system for detecting glass breakage is disclosed, having security system circuitry which, in addition to detecting complete loss of electrical continuity, also can detect and respond to a change in electrical resistance values. The electrical resistance values are determined by the electrical resistance of a trace or patch of electrically resistive material carded on a surface of the glazing pane. Multiple patches carded, one each, on the windows of a motor vehicle are connected in series in the security system of the Madau patent. A patch resistance value from 13–50 ohms is suggested, with the patch material being deposited onto the surface of the glass by silkscreening.

Suitable resistive materials are known for forming a suitable resistive patch or trace on the surface of a glazing pane. Such materials can present difficulties, however, in establishing secure electrical connections to electrical leads from the security system circuitry. Such difficulties can be especially significant in the context of high volume production, such as a motor vehicle assembly line, where it is desirable to form such structurally reliable electrical connection quickly, and with good repeatability and repairability. It is an object of the present invention to provide a glazing unit security system which is not easily defeated by short-circuiting electrical terminals of the system, and yet is readily adaptable to modern commercial assembly operations. These and additional objects and advantages of the invention will be apparent from the following general disclosure and detailed description of certain preferred embodiments.

SUMMARY

In accordance with a first aspect, a glazing unit has a frangible glazing pane, such as a tempered glass pane, carrying a glazing pane breakage detector assembly on its surface. The detector assembly includes first and second electrically conductive bus pads formed of electrically conductive material on the surface of the glazing pane. The electrically conductive material of the bus pads preferably is highly electrically conductive, and forms a structurally secure attachment to the glazing pane surface. An electrically resistive trace on the glazing pane surface is formed of electrically resistive material different from the electrically conductive material of the bus pads. The electrically resistive trace establishes electrical interconnection between the bus pads. Electrical leads for connecting the detector assembly to suitable security system circuitry can be reliably and securely attached to the bus pads. Preferably, upstanding attachment tabs are secured to the bus pads, for example, by electrically conductive epoxy, solder or the like. Electrical leads can then be connected to the upstanding attachment tabs, optionally being removably attached. In preferred embodiments discussed further below, the resistive trace is formed of polymeric material self-adhered to the surface of the glazing pane. The resistive trace can be formed of materials which yield a surface bond to the glazing pane which is not sufficiently structurally sound to afford reliable attachment for an electrical lead connecting the trace to security system circuitry, since that function is provided instead by the highly electrically conductive bus pads.

In accordance with another aspect, a motor vehicle security system includes a glazing unit as described above, mounted in a motor vehicle, for example, as a motor vehicle backlite. Security system circuitry also is mounted in the vehicle, electrically connected to the detector assembly of the glazing unit, for sensing and responding to a change in the resistance value of the resistive trace which exceeds a predetermined amount.

Those who are skilled in the art, that is, those who are skilled in this area of technology, will recognize that the present invention provides a significant technological advance having important commercial advantages. The bus pads are easily and reliably formed, optionally using silk-screening or other known techniques whose application to the present invention will be readily apparent in view of this disclosure. Silver-filled paint, currently used in forming heater grids or the like for motor vehicle windows, can be used in such techniques to form highly electrically conductive bus pads having structurally secure attachment to a tempered glass or other glazing pane. With the benefit of the present disclosure, it also will be apparent that commercially available attachment tabs for attachment of electrical leads can be secured to the bus pads using known materials and techniques, such as electrically conductive epoxy, solder and the like. Thus, attachment tabs can be provided with structurally sound attachment and good electrical connection to the bus pads. In view of the present disclosure, it will be apparent that such attachment tabs can provide significant cost, complexity and reliability advantages in connecting electrical leads from security system circuitry in the course of high volume commercial assembly operations. The resistive trace interconnecting the bus pads can be readily formed using known techniques and materials whose application to the present invention will be readily apparent from the present disclosure. Resistive materials can be selected which provide a fragile resistive trace on the surface of the glazing pane, since the trace need not be relied upon in the present invention to provide a structurally sound attachment for electrical leads from security system circuitry. A fragile resistive trace is desirable and advantageous for providing ready loss of electrical continuity in the event of fracture of the glazing pane underlying the resistive trace. It is not a disadvantage as in prior known systems, since attachment of electrical leads from the security system circuitry need not rely on the structural soundness of the resistive trace for a secure electrical connection. Rather, such structurally secure attachment is provided by the bus pads, as mentioned above.

It is a further significant advantage of the present invention that the resistive value of the trace can be either predetermined or variable. The resistive value can be predetermined by controlling the distance between the bus pads and the configuration of the resistive trace interconnecting them. The resistive value can be varied from one glazing pane to the next, even given uniform spacing between the bus pads, by modifying the material and/or the configuration (that is, the size, shape, etc.) of the resistive trace. In accordance with one alternative embodiment, the resistive trace can be painted onto a glazing pane by hand with deliberate variation in its configuration. Security system circuitry can be readily provided by those skilled in the art, which can use an initial reading of the resistive value of the trace as a reference value against which future readings are compared to detect any unacceptably large change in value. Suitable circuitry can be provided, for example, in accordance with the teachings of the above mentioned commonly owned U.S. Pat. No. 5,389,911 to Madan, the entire disclosure of which is incorporated herein by reference.

Thus, the glazing units and security systems incorporating them, which are disclosed here, can provide security against undetected breakage of the glazing pane. Total loss of electrical continuity between the bus pads can be detected by security system circuitry. Additionally, any attempt to provide an auxiliary short circuit between the bus pads, for example, by a jumper cable or the like between the attachment tabs, would provide an altered resistive value which also can be detected by security system circuitry. Especially in those embodiments wherein the resistive value of the trace is variable from one glazing unit to the next, measuring the resistive value of the resistive trace on one glazing unit would not provide information useful for defeating a security system incorporating a different one of such glazing units.

These and additional features and advantages will be further understood from the following detailed description of certain preferred embodiments.

BRIEF DESCRIPTION OF THE DRAWINGS

Certain preferred embodiments of the glazing unit disclosed here are described below, including embodiments incorporating such glazing units in a motor vehicle security system, with reference to the appended drawings wherein.

DETAILED DESCRIPTION OF CERTAIN PREFERRED EMBODIMENTS

Figure 1:
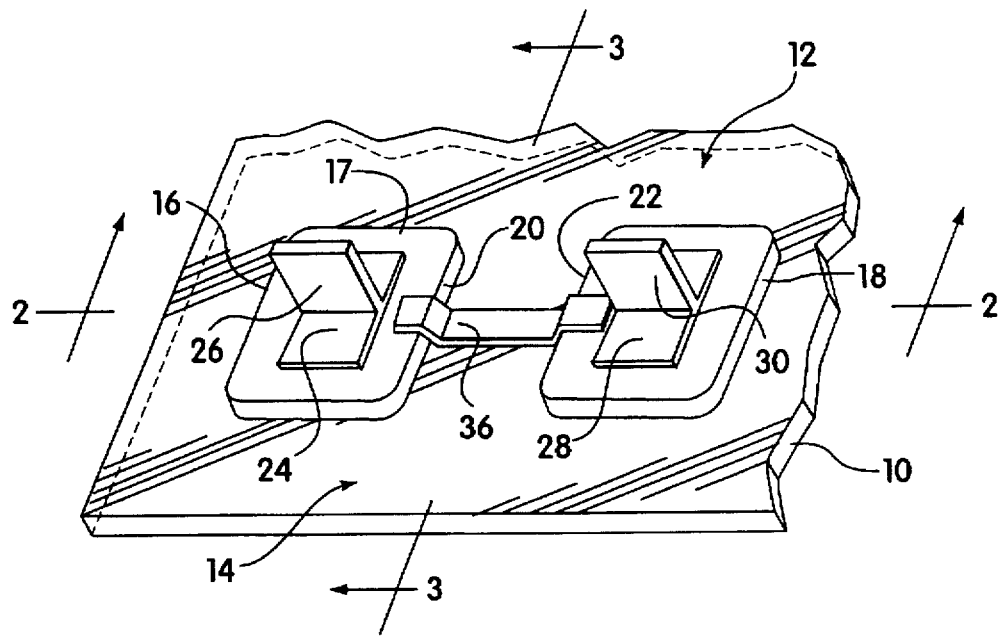
FIG. 1 is a schematic perspective view of a glazing unit incorporating a glazing pane, partially broken away, and a breakage detector assembly in accordance with one preferred embodiment.

It should be understood that glazing units in accordance with the present invention and, in particular, the glazing pane breakage detector assemblies of such glazing units, may have dimensions and configurations differing from those of the preferred embodiments illustrated in the appended drawings. The relative size and configuration of the bus pads, resistive trace, electrical lead attachment tabs, etc., would be determined in large part by the particular application for which the glazing unit is intended. It will be well within the ability of those skilled in the art, given the benefit of the above disclosure and the following detailed description of certain preferred embodiments, to select suitable component configurations, materials, production techniques and the like, to meet the needs of such particular applications. It also should be understood that the dimensions of certain features or aspects shown in the appended drawings have been enlarged or otherwise modified for clarity of illustration. Thus, for example, the thickness of the bus pads and resistive trace in the embodiment of FIGS. 1-3, relative the thickness of the underlying glazing pane, are greater than would likely be used in a routine application of the invention in a motor vehicle security system.

While the glazing units disclosed here, and security systems incorporating them, can be employed in diverse applications, they are especially advantageous for use in motor vehicle applications. Accordingly, the following detailed description of certain preferred embodiments focusses primarily on motor vehicle security system applications. In particular, the present invention is advantageous for use in side windows and especially backlites formed of tempered glass. Tempered glass undergoes overall shattering upon sustaining any significant fracture anywhere in the expanse of the glass. Thus, any significant fracture of one of these glazing panes will cause fracturing also of that portion of the pane under the resistive trace. The resistive trace is sufficiently fragile that such fracturing of the underlying pane will cause loss of electrical continuity of the trace. The resulting loss of electrical continuity can be detected by associated security system circuitry.

Thus, the resistive trace can be formed of any suitable material which is sufficiently robust to withstand handling during assembly and the use environment of the intended application, and yet sufficiently fragile that breakage of the glazing pane results in loss of its electrical continuity. The resistive trace can be formed of various different materials and by various techniques, so as to be sufficiently fragile as to have insufficient structural integrity to maintain electrical continuity upon shattering of the underlying glazing pane. Suitable materials for forming the resistive trace are commercially available and will be apparent to those skilled in the art in view of this disclosure. Suitable film-forming conductive inks are available, including, for example, product No. 114-11 from Creative Materials, Inc. (Tyngsboro, Mass.), either alone or in mixture with their product No. 114-34. Another example is ORMET 2005 conductive ink from Toranaga Technologies, Inc. Conductive epoxies and other curable polymeric materials also are commercially available and suitable for certain preferred embodiments. One particularly preferred resistive material is product No. 115-50, silver-filled electrically conductive ink, available from Creative Materials, Inc. Various conductive epoxies are known to those skilled in the art, and the curing procedure will depend upon the conductive epoxy selected. Certain conductive epoxies, for example, are self-curing at ambient conditions, or by exposure to ultraviolet or other actinic radiation, by thermal curing upon exposure to elevated temperatures, or the like. Suitable conductive epoxy material is disclosed, for example, in U.S. Pat. No. 5,114,756 to Mirabeau. Alternative suitable conductive epoxies are commercially available and will be apparent to those skilled in the art in view of this disclosure.

These liquid and semi-liquid film-forming materials can be applied, for example, by a roller directly onto the surface of the glazing pane. Silkscreening and like application processes also are typically suitable for such materials. In addition, as mentioned above, it may be desirable in certain applications to apply the resistive trace in a random manner, for example, by painting the trace onto the glazing pane freehand in a non-straight, irregular pattern or path between the bus pads. A resistive material having certain electrical conductivity properties will in this fashion yield a different resistive value for the detector assembly from one glazing pane to the next. Using security system circuitry adapted to employ an initial resistance reading as a reference value, would in this case result in a unique and unpredictable resistance value for each glazing unit. It would, therefore, be quite difficult to defeat the security system by attaching a jumper cable between the two bus pads as a substitute for the resistive trace (whose electrical conductivity would, presumably, be thereafter lost due to intentional breaking of the glazing pane), since it would be difficult to predict the exact required resistive value for such a jumper cable. It will be within the ability of those skilled in the art to provide such security system circuitry, given the benefit of the present disclosure, including the incorporated disclosure of the above mentioned Madau patent.

While the resistance value will vary from one application to another, an exemplary range for motor vehicle security system applications is from 10 ohms to 1,500 ohms, measured from one bus pad to the other. A value of 500 ohms to 1,200 ohms is suitable, for example, since higher resistance values result in a smaller drain on the motor vehicle battery. The security system circuitry would detect and respond either to a loss of electrical continuity between the bus pads, presumably corresponding to breakage of the glazing pane, and/or to a change of electrical resistance between the bus pads exceeding a predetermined amount. Such predetermined amount of resistance change will depend, of course, on the particular application and on the overall resistance value. In that regard, it should be recognized that the resistance value seen by the security system circuitry may be a cumulative value resulting from the series connection of multiple resistive traces, such as one on each of several windows of the motor vehicle. For a resistance value between 500 and 1,200 ohms (for an individual resistive trace or multiple traces connected in series), for example, the amount of change tolerated by the security system circuitry before responding can be preset at a value of about 5 to 50 ohms.

The security system can respond to a loss of electrical continuity or unacceptably large change in resistivity by an audible and/or visible alarm. The security system may also be adapted to disable normal operation of the motor vehicle. In preferred motor vehicle applications, the security system circuitry determines the electrical continuity and resistance value of the breakage detector assemblies, either directly or indirectly, continuously or, more preferably, repeatedly. The frequency at which the security system tests the breakage detectors can vary widely, depending upon the available power resources, level of security desired, and other aspects of the particular application. The frequency (or average frequency) can be set, for example, between once every few seconds and once every hundred milliseconds. It will, in general, be within the ability of those skilled in the art to select a suitable test frequency, given the benefit of the present disclosure.

It is especially important for motor vehicle applications that the detector assembly not have significant adverse impact on the appearance of the vehicle. For this reason, the detector assembly preferably is located along a peripheral edge of the glazing pane, most preferably on an inside surface hidden behind black-out paint or the like. In any event, the detector assembly most preferably is kept to a small overall size. For this reason, the bus pads should be as closely spaced as possible, consistent with the need to lose electrical continuity upon fracture of the glazing pane. Motor vehicle backlites and side window glass typically employ tempered glass panes which undergo overall fracture into pieces of one-half inch size or smaller. Thus, in particularly preferred embodiments the bus pads are carded on a tempered glass pane, spaced from each other one-half inch to three-quarter inch apart.

Figure 2:
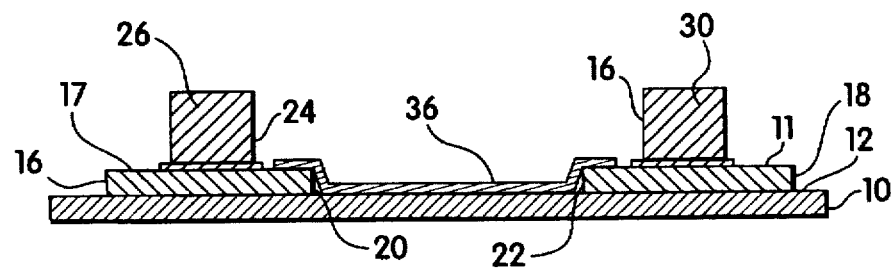
FIG. 2 is a section view of the glazing unit of FIG. 1, taken through line 2—2 of FIG. 1.
Figure 3:
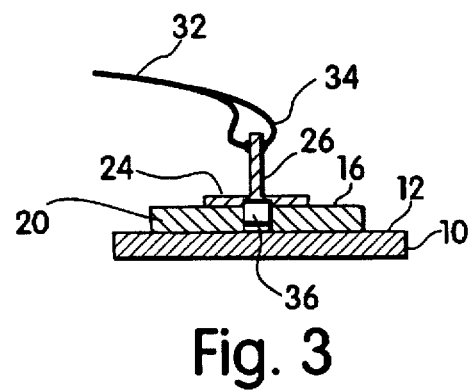
FIG. 3 is a section view of the glazing unit of FIGS. 1 and 2, taken through line 3—3 of FIG. 1.

A glazing unit in accordance with one preferred embodiment is illustrated in FIGS. 1 to 3, comprising a tempered glass pane 10 having surface 12 carrying a glazing pane breakage detector assembly 14. The detector assembly includes a first highly electrically conductive bus pad 16 and a second such bus pad 18 at a predetermined distance from the first bus pad 16. The distance between the bus pads is the shortest distance between them, that is, the distance between edge 20 of bus pad 16 and edge 22 of bus pad 18. Bus pads 16 and 18 preferably are silkscreened onto surface 12 of glass pane 10 using silver-filled paint, such as is currently in use to make bus bars for backlite heater grids and the like. Attachment tabs are secured to the bus pads with good electrical contact. Specifically, a first attachment tab 24 is attached to upper surface 17 of first bus pad 16, for example by conductive epoxy, soldering, etc. While electrical leads from the security system circuitry can be soldered or otherwise attached directly to the bus pad, use of attachment tabs is preferred and advantageous. Significant advantage is obtained, for example, in facilitating attachment of the electrical leads in a commercial motor vehicle assembly line operation. Exemplary attachment tabs include, for example, URX tabs which provide an upstanding attachment flange having a bent-over end. An upstanding attachment tab is schematically illustrated by upstanding flange 26 of attachment tab 24. Other suitable, commercially available attachment tabs include, for example, Molex tabs which provide a female receptacle for receiving electrical leads. Additional suitable attachment tabs are commercially available, and their application in the present invention will be apparent to those skilled in the art, given the benefit of the present disclosure. A second attachment tab 28 having upstanding attachment flange 30 is secured with good electrical contact onto upper surface 19 of the second bus pad 18. In FIG. 3 an electrical lead 32 is shown attached to upstanding flange 26 of attachment tab 24. Specifically, spring clip 34 of electrical lead 32 is shown to be received over upstanding flange 26. As thus far described, the detector assembly components have structurally sound attachment to glazing pane 10, with good electrical connection between the bus pads and the attachment tabs.

Figure 5:
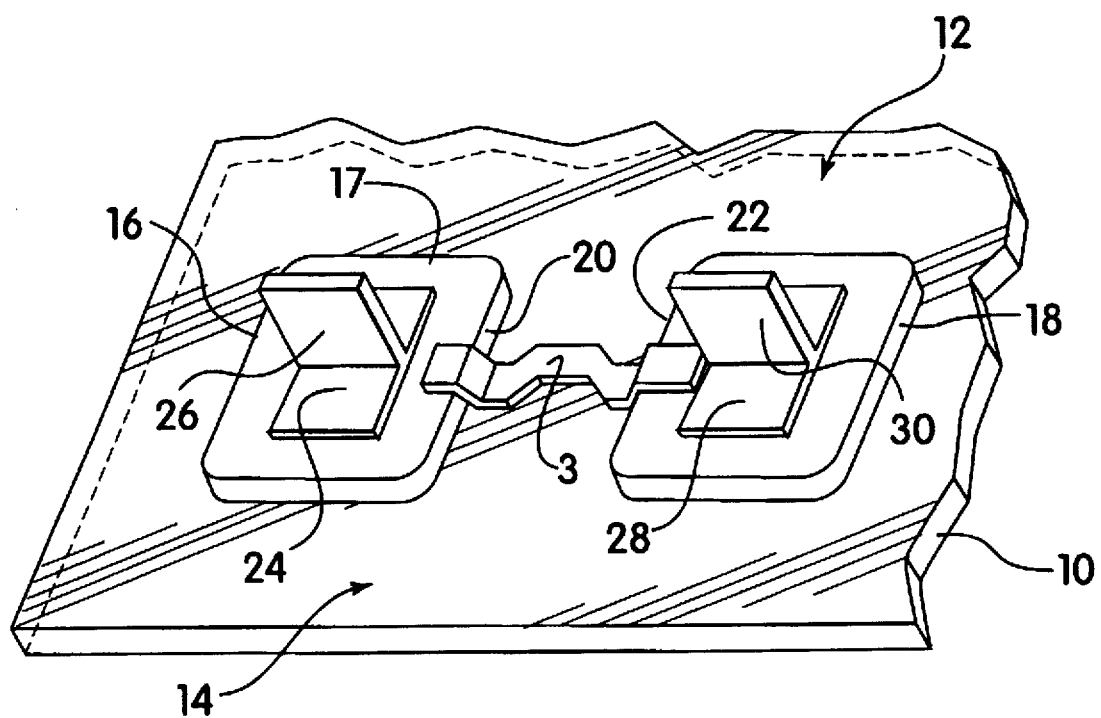
FIG. 5 is a schematic perspective view of the glazing unit of FIG. 1 showing a resistive trace with a non-straight line irregular path.

The detector assembly 14 of the glazing unit illustrated in FIGS. 1–3 further comprises a resistive trace 36 bridging the gap between the bus pads 16, 18. The resistive trace is seen to be straight, but could instead follow an irregular path, resulting in a resistance value different from that which would be obtained with a straight trace between the bus pads (as seen in FIG. 5). The resistive trace overlaps the bus pads somewhat to establish good electrical connection. The resistive trace 36 can be applied, for example, by silkscreen, roller, hand-held paintbrush, etc., after the bus pads have first been formed on the glass pane. Resistive trace 36 is advantageously fragile, so as to undergo loss of electrical continuity in the event of the fracture of the underlying glass pane. The fragility of the conductive trace is no disadvantage regarding the structural integrity of the detector assembly, since the attachment tabs 24, 28 are secured to the bus pads 16, 18, rather than to the resistive trace. Preferably, the resistive trace is quite short to minimize its aesthetic impact on the outward appearance of the motor vehicle glazing pane to which it is attached. Most preferably, it is between 0.5 and 2.0 inches long. To facilitate accurate sizing of the resistive trace, the bus pads can be applied having a predetermined distance between them equal to the intended length of the resistive trace. The trace would overlap the two bus pads and its effective length would be the distance between the bus pads, that is, preferably, between 0.5 and 2.0 inches.

Figure 4:
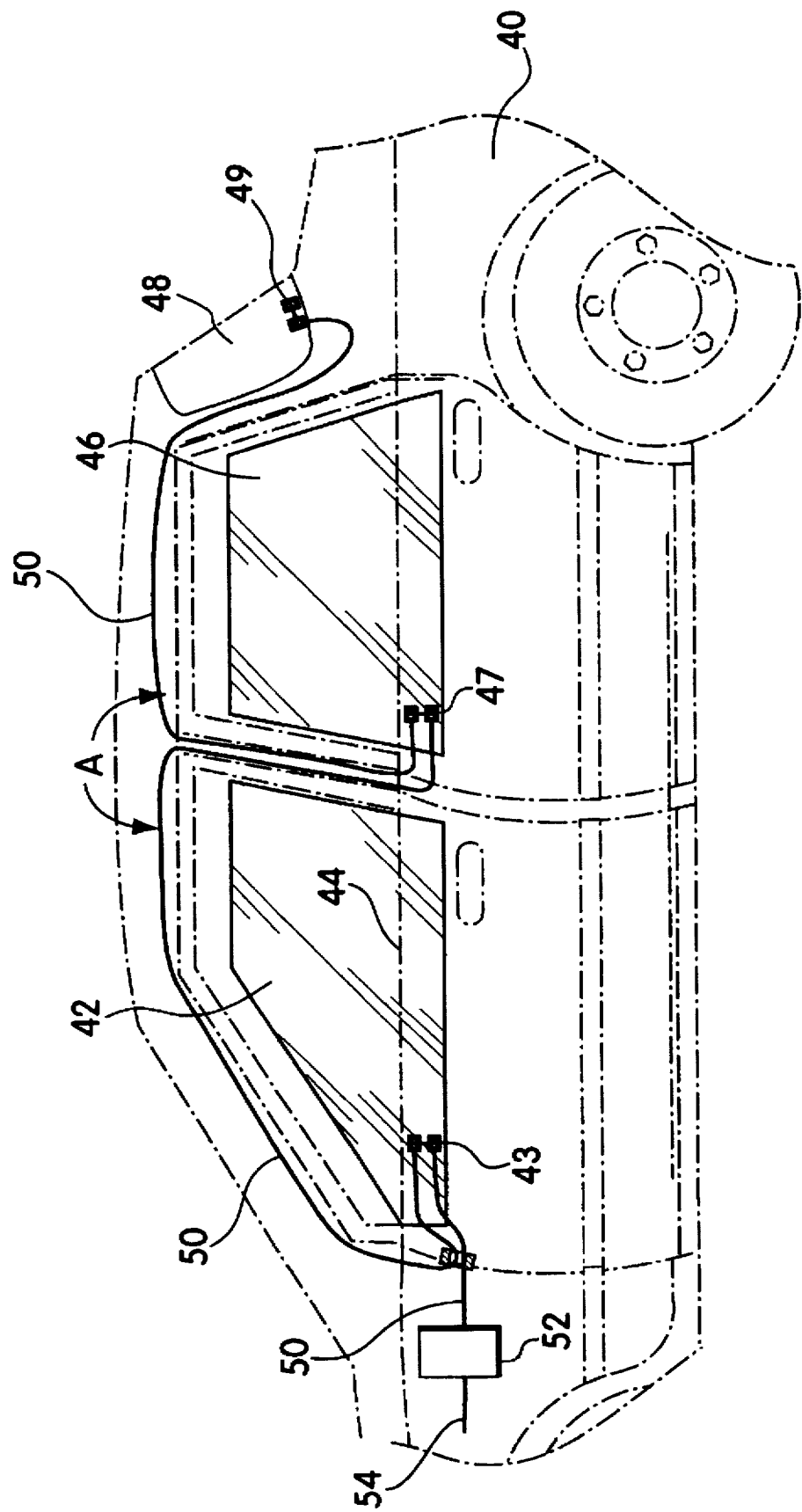
FIG. 4 is a schematic perspective view of a motor vehicle incorporating a glazing unit security system in accordance with a preferred embodiment of the invention.

A motor vehicle glazing unit security system is illustrated in FIG. 4, comprising multiple glazing units fitted with a detector assembly, as described above. Motor vehicle 40 is seen to have a front driver door window 42 of tempered glass, carrying a breakage detector 43 at its lower left corner (as viewed in FIG. 4) in an area below the so-called beltline 44, such that it would not be visible during normal operation of the window between its open position and its closed or full-up position. Similarly, rear door window 46 carries at its forward lower corner a breakage detector 47. Backlite 48 carries breakage detector 49 in a lower corner. Breakage detectors 43, 47 and 49 are in series electrical connection by means of electrical lead 50. Electrical lead 50 extends from security system circuitry 52 to a first attachment tab of breakage detector 43. A second portion of lead 50 extends from the second attachment tab of breakage detector 43 to the first attachment tab of breakage detector 47. A next portion of lead 50 extends from the second attachment tab of breakage detector 47 to the first attachment tab of breakage detector 49. The second attachment tab of breakage detector 49 can be grounded, or extend on to further series connections. A second lead 54 from security system circuitry 52 extends to series electrical connection of breakage detectors attached to windows on the passenger side of vehicle 40. The breakage detectors are seen to be advantageously small to minimize any interference with the visual aesthetics of the vehicle.

Backlite 48 and side windows 42 and 46 are formed of tempered glass. A fracture in any of these glass panes would result in an overall shattering of that pane, and a consequent loss in electrical continuity of a resistive trace bridging between the bus pads of the breakage detector assembly carried by that pane. Such loss of electrical continuity would be detected by circuitry 52 which has electrical power feed from a vehicle battery or other power source. Circuitry 52 is adapted to respond upon detecting such loss of continuity, for example, by actuating an audible alarm, a visual alarm, and/or disabling means for preventing normal operation of the vehicle. These and other alarms and disablement means are commercially available, and their application in the present invention will be readily apparent to those skilled in the art, given the benefit of the present disclosure. Circuitry 52 is adapted further to respond to a change in the resistance value of the series electrical circuits interconnecting the breakage detector assemblies. An attempt to mask the loss of electrical continuity of a detector assembly by applying a jumper wire or cable between the two bus pads would yield a different cumulative resistance value, and circuitry 52 would respond to change in value.

Another preferred embodiment is shown in FIG. 5. Resistive trace 37 in this embodiment follows an irregular path between bus pads 16, 18, resulting in a resistance value different from that which would be obtained from the straight line path of resistive trace 36 of FIG. 1.

In view of the foregoing disclosure and discussion of various preferred embodiments of the invention, those skilled in the art will readily understand that suitable additions, modifications and alternative embodiments are within the true scope and spirit of the invention. All such modifications, additions and alternative embodiments are intended to be included within the scope of the appended claims.

We claim:

1. A glazing unit comprising a frangible glazing pane having a surface and a glazing pane breakage detector assembly comprising:
    first and second electrically conductive bus pads formed of electrically conductive material on the surface of the glazing pane;
    an electrically resistive trace on the surface of the glazing pane, formed of electrically resistive material different from the electrically conductive material of the bus pads, establishing a non-short circuit electrical interconnection between the bus pads; and
    first and second upstanding electrical lead attachment tabs secured in electrical contact onto the first and second bus pads, respectively.

2. The glazing unit of claim 1 wherein the electrically resistive material is polymeric material self-adhered to the surface of the glazing pane.

3. The glazing unit of claim 2 wherein the electrically resistive material is selected from the group consisting of conductive epoxy and conductive ink.

4. The glazing unit of claim 1 wherein the electrically resistive trace has a non-straight line, irregular path between the bus pads.

5. A motor vehicle glazing unit security system comprising:
    a glazing unit mounted in a motor vehicle and comprising a tempered glass pane having a surface;
    a glazing pane breakage detector assembling comprising:
        first and second electrically conductive bus pads of electrically conductive material at spaced locations on the surface of the glass pane;
    first and second upstanding electrical lead attachment tabs secured in electrical contact onto the first and second bus tabs;
    an electrically resistive trace on the surface of the glass pane, formed of electrically resistive material different from the electrically conductive material of the bus pads, establishing an electrical interconnection between the bus pads having a non-short circuit resistance value; and
    security circuitry electrically connected to the detector assembly via the upstanding electrical lead attachment tabs, for sensing and responding to a change greater than a predetermined amount in the resistance value of the resistive trace.

6. The motor vehicle glazing unit security system in accordance with claim 5 further comprising multiple additional glazing units mounted in the motor vehicle, each having a tempered glass pane having a surface and a glazing pane breakage detector assembly comprising:
    first and second electrically conductive bus pads formed of electrically conductive material on the surface of the glazing pane, and an electrically resistive trace on the surface of the glazing pane, formed of electrically resistive material different from the electrically conductive material of the bus pads, establishing a non-short circuit electrical interconnection between the bus pads, and wherein the security circuitry electrically interconnects the detector assemblies in series, for sensing and responding to a change greater than a predetermined value in a cumulative resistance value of the resistive traces.

7. The motor vehicle glazing unit security system in accordance with claim 6 wherein the cumulative resistance value is between 10 and 1,500 ohms and the predetermined amount is between 5 and 50 ohms.

8. A motor vehicle glazing unit security system comprising:

a glazing unit mounted in a motor vehicle and comprising a tempered glass pane having a surface;

a glazing pane breakage detector assembling comprising:
first and second electrically conductive bus pads of electrically conductive material at spaced locations on the surface of the glass pane; and
an electrically resistive trace on the surface of the glass pane, formed of electrically resistive material different from the electrically conductive material of the bus pads, establishing an electrical interconnection between the bus pads having a non-short circuit resistance value;

security circuitry electrically connected to the detector assembly for sensing and responding to a change greater than a predetermined amount in the resistance value of the resistive trace; and multiple additional glazing units mounted in the motor vehicle, each having a tempered glass pane having a surface and a glazing pane breakage detector assembly comprising:
first and second electrically conductive bus pads formed of electrically conductive material on the surface of the glazing pane, and
an electrically resistive trace on the surface of the glazing pane, formed of electrically resistive material different from the electrically conductive material of the bus pads, establishing a non-short circuit electrical interconnection between the bus pads;

wherein the security circuitry electrically interconnects the detector assemblies in series, for sensing and responding to a change greater than a predetermined value between 5 and 50 ohms in a cumulative resistance value of the resistive traces between 10 and 1,500 ohms, and the resistive traces have dissimilar configurations.

9. A motor vehicle glazing unit security system comprising:

a backlite mounted in a motor vehicle and comprising a tempered glass pane having a surface;

a backlite breakage detector assembly comprising:
first and second electrically conductive bus pads of electrically conductive silver-filled paint material on the surface of the glass pane at a predetermined distance between 0.5 and 2.0 inches from each other,
first and second upstanding electrical lead attachment tabs secured in electrical contact onto the first and second bus pads, respectively, and
an electrically resistive trace on the surface of the glass pane, formed of electrically resistive polymeric material self-adhered to the surface of the glass pane and different from the silver-filled paint material of the bus pads, establishing an electrical interconnection between the bus pads with an electrical resistance value between 500 and 1,500 ohms; and security circuitry electrically connected to the detector assembly via an electrical lead attached to the attachment tabs for sensing and responding to a change in the resistance value greater than a predetermined amount between 5 and 50 ohms.

\* \* \* \* \*